US008128223B2

(12) United States Patent  (10) Patent No.: US 8,128,223 B2
Legerton et al.  (45) Date of Patent: Mar. 6, 2012

(54) METHODS AND THERAPEUTIC OPTICAL DEVICES FOR REGULATION OF ASTIGMATISM

(75) Inventors: Jerome A. Legerton, San Diego, CA (US); William E. Meyers, Scottsdale, AZ (US)

(73) Assignee: CRT Technology, Inc., Mesa, AZ (US)

( * ) Notice: Subject to any disclaimer, the term of this patent is extended or adjusted under 35 U.S.C. 154(b) by 299 days.

(21) Appl. No.: 12/575,917

(22) Filed: Oct. 8, 2009

(65) Prior Publication Data

US 2011/0085129 A1  Apr. 14, 2011

(51) Int. Cl.
  *G02C 7/04*  (2006.01)
(52) U.S. Cl. .................. 351/160 R; 351/160 H; 351/161
(58) Field of Classification Search .............. 351/160 R, 351/160 H, 161, 177
  See application file for complete search history.

(56) References Cited

U.S. PATENT DOCUMENTS

| 5,570,143 A | 10/1996 | Newman |
| 6,176,579 B1 | 1/2001 | Mandell |
| 7,025,460 B2 | 4/2006 | Smitth et al. |
| 7,401,922 B2 | 7/2008 | Legerton |
| 2003/0086055 A1 | 5/2003 | Morris et al. |
| 2007/0115431 A1 | 5/2007 | Smith, III et al. |
| 2007/0159601 A1 | 7/2007 | Ho et al. |
| 2007/0296916 A1 | 12/2007 | Holden et al. |

FOREIGN PATENT DOCUMENTS

| WO | 2007041796 | 4/2007 |
| WO | 2008014544 | 2/2008 |
| WO | 2008131479 | 11/2008 |

OTHER PUBLICATIONS

U.S. Appl. No. 12/110,999 filed, Apr. 28, 2008, titled "System and Method to Treat and Prevent Loss of Visual Acuity", first named inventor William E. Meyers.
U.S. Appl. No. 12/413,319, filed Mar. 27, 2009, titled "Contact Lens with Meridional Sagittal Variation and Methods for Making and Using the Same", first named inventor Jerome A. Legerton.
International Search Report and Written Opinion for International Application No. PCT/US2010/051479 dated Nov. 29, 2010.
International Preliminary Report on Patentability for International Application No. PCT/US2010/051479 dated Oct. 3, 2011.

*Primary Examiner* — Scott J Sugarman
(74) *Attorney, Agent, or Firm* — Snell & Wilmer L.L.P.

(57) ABSTRACT

In accordance with exemplary embodiments, the present invention provides a therapeutic optical device configured to focus the central retinal image in at least one meridian and focus at least one semi-meridian of the peripheral image field in front of or behind the retina to stimulate eye and/or corneal reshaping to reduce astigmatism. In exemplary embodiments, the device further provides rotational stability.

14 Claims, 4 Drawing Sheets

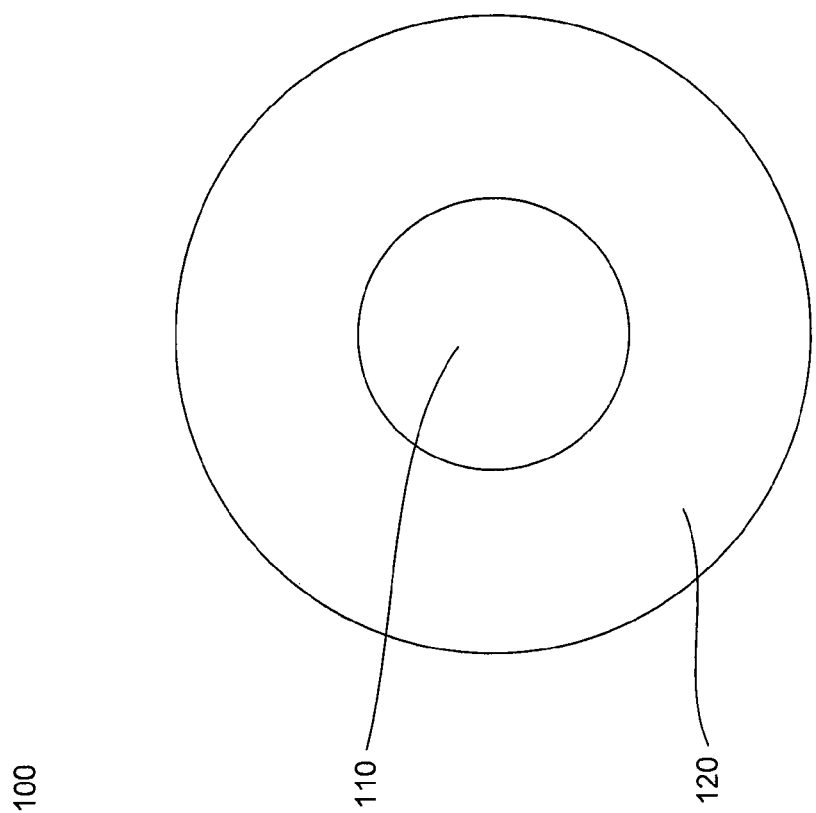

METHODS AND THERAPEUTIC OPTICAL DEVICES FOR REGULATION OF ASTIGMATISM

FIELD OF INVENTION

The present invention relates to contact lenses, and more specifically, to contact lenses designed for regulation of astigmatism.

BACKGROUND OF THE INVENTION

Astigmatism is optically characterized as the condition wherein one meridian of the image field is focused in front of an orthogonal meridian. In this manner, one meridian can be properly focused on the retina while the other is in front of or behind the retina. In such a case, the meridian focused in front of the retina could be described as myopic. Further, if one meridian were focused on the retina and the meridian ninety degrees away were focused behind the retina, the meridian focused behind the retina could be described as hyperopic. It is also possible to have one meridian focused in front of the retina and the other principle meridian focused behind the retina; respectively, the first could be described as myopic and the second hyperopic. This case is frequently described as mixed astigmatism.

Animal studies have demonstrated the ability to influence the development of refractive error by placing the peripheral image field in front of or behind the retina while the central image field is accurately focused. Corneal reshaping to reduce the amplitude of myopia, by increasing the radius of curvature of the central cornea while leaving the peripheral curvature unchanged, has demonstrated the ability to reduce or halt the progression of myopia. The mechanism is understood to be the placement of the peripheral image field in front of the retina while the central image field is accurately focused on the retina.

The current lens designs for corneal reshaping are intended to increase the radius of curvature of the central cornea for the treatment of myopia and decrease the radius of curvature of the central cornea for the treatment of hyperopia. There is evidence that, fortuitously, the lenses for reducing the amplitude of myopia also regulate the progression of myopia by way of the resultant off axis optical power of the mid peripheral cornea relative to the on axis central optical power of the cornea.

The prior art teaches the methods of reshaping the central cornea to correct refractive error. For the treatment of myopia, the central corneal radius is increased by way of applying a lens having a central radius of curvature longer than the pre treated central corneal radius; conversely, for the treatment of hyperopia, the central corneal radius is decreased by way of applying a lens having a central radius of curvature shorter than the pre treated central corneal radius. In the prior art, the mid peripheral cornea is found to remain substantially unchanged during treatment.

The prior art does not address mid peripheral corneal reshaping or off axis optics to place the peripheral image field in front of or behind the retina and while the central image field is accurately focused. As a result, the prior art is unable to effectively eliminate astigmatism or reduce astigmatism amplitude. The present invention addresses these needs and other limitations of the prior art.

SUMMARY OF THE INVENTION

This invention describes methods and therapeutic optical devices to regulate astigmatism by reshaping an eye with a resultant eliminated astigmatism or reduced astigmatism amplitude. In exemplary embodiments, this invention regulates astigmatism by modulating the shape of the mid peripheral cornea, or by using a lens comprising off axis optics, to focus one meridian in front of or behind another, relative to the peripheral retina.

In exemplary embodiments, an eye is presented with a therapeutic optical device that directly or indirectly produces a central retinal image that may be, but is not necessarily, focused in all meridians, while the peripheral image field in a first meridian is placed on, in front of or behind the retina, and the peripheral image field in a second substantially orthogonal meridian is focused in front of or behind that in the first meridian. The intention of the therapeutic optical device is to place the peripheral image field with reference to the retina in the direction that reshaping of the globe (e.g., axial, equatorial, mid peripheral and/or far peripheral) is preferred in order that the astigmatism would be reduced or eliminated.

In accordance with exemplary embodiments, a therapeutic optical device can be achieved by way of corneal reshaping or by way of a contact lens or other refractive correction, wherein the central retinal image may be, but is not necessarily, focused in all meridians, and the peripheral image field is relatively defocused in at least one meridian. In the case of corneal reshaping, an exemplary treatment would produce a central corneal geometry that would render the eye emmetropic or hyperopic while the peripheral corneal shape would focus the previously most myopic meridian on or in front of the peripheral retina while the least myopic meridian would be focused behind the most myopic meridian.

BRIEF DESCRIPTION OF THE DRAWINGS

The exemplary embodiments of the present invention will be described in conjunction with the appended drawing figures in which like numerals denote like elements and:

FIG. 1 illustrates a therapeutic optical device of the present invention;

DETAILED DESCRIPTION

Figure 2B:
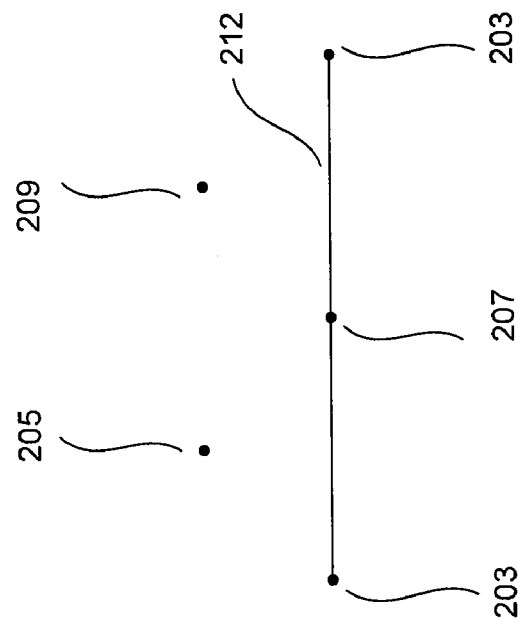
FIGS. 2A and 2B illustrate therapeutic off-axis foci with reference to the retina at different semi-meridians, provided for by a therapeutic optical device of the present invention.

The present invention relates to contact lenses designed for regulation of astigmatism. One skilled in the art will appreciate that various aspects of the invention may be realized by any number of materials or methods configured to perform the intended functions. For example, other materials or methods may be incorporated herein to perform the intended functions. It should also be noted that the drawings herein are not all drawn to scale, but may be exaggerated to illustrate various aspects of the invention, and in that regard, the drawings should not be limiting.

In exemplary embodiments, the present invention comprises a therapeutic optical device configured to focus the central retinal image in all meridians and not focus at least one semi-meridian of the peripheral image field on the retina. In exemplary embodiments, at least one semi-meridian of the peripheral image field is deliberately focused anterior or posterior to the retina.

In exemplary embodiments, the therapeutic optical device is configured for direct or indirect contact with ocular tissue of a human or other mammal. For example, in accordance with one aspect of an exemplary embodiment, the therapeutic optical device is configured to rest upon the cornea, and in some cases also the sclera, of the eye, similar to a conventional soft, hybrid bimodulus, or rigid contact lens. In other embodiments, however, the therapeutic optical device is configured for placement within ocular tissue, for example, as an intracorneal or intraocular implant.

In accordance with exemplary embodiments, the therapeutic optical device is comprised of one or more gas permeable, or otherwise biocompatible, materials. For instance, the therapeutic optical device may be comprised of one or more of fluorosilicon acrylate, silicon acrylate, polymethylmethacrylate, a silicon hydrogel, or another suitable material. It is also contemplated that different portions of a given therapeutic optical device may be comprised of the same or different materials.

In general, therapeutic optical device should be broadly construed such that any structure or method by which the central retinal image may be, but is not necessarily, focused in all meridians, and at least one semi-meridian of the peripheral image field is not focused on the retina, falls within the scope thereof. In that regard, various forms of laser surgery known in the art are contemplated as additional therapeutic optical devices within the spirit and scope of the present invention.

Corneal Lenses

In exemplary embodiments, and as shown in FIG. 1, the therapeutic optical device 100 of the present invention comprises a central zone 110 and one or more peripheral zones 120.

Central Zone

In accordance with exemplary embodiments, the central zone is configured to focus the central retinal image in all meridians, while in other exemplary embodiments, the central zone is configured to defocus the central retinal image in one or more meridians. In accordance with exemplary embodiments, the central zone is selected to have a power equal to or not equal to the refractive error of the eye for the purpose of focusing the image relative to the central retina.

In accordance with exemplary embodiments, the central zone is generally concentric with and comprises the axial center of the therapeutic optical device. In some embodiments, the central zone has a diameter of from about 0.1 mm to about 14 mm and more preferably from about 3 mm to about 7 mm.

In exemplary embodiments, the central zone is configured to have a spherical geometry, while in others, it may have an aspherical, toric, multifocal or rotationally non-symmetrical geometry, depending on the refractive error to be regulated and/or the ocular tissue to be fitted. Such measurements may be obtained for example, using keratometry, corneal topography, optical coherence tomography, Scheimpflug imaging, or other conventional biometric instrumentation.

Peripheral Zone(s)

In accordance with exemplary embodiments, the therapeutic optical device is comprised of one or more peripheral zones, at least one of which is configured to not focus at least one semi-meridian of the peripheral image field on the retina. Stated differently, in exemplary embodiments, at least one peripheral zone is configured to focus at least one semi-meridian of the peripheral image field anterior or posterior to the retina.

For the sake of simplicity, the present invention may be described herein in terms of a single peripheral zone, but it should be understood that a plurality of peripheral zones, each having its own independent functions and structural, material, and refractive properties, may be used.

In accordance with exemplary embodiments, a peripheral zone is generally concentric with and annular to the central zone. In some embodiments, a peripheral zone has a constant width circumferentially, for example, from about 0.1 mm to about 6 mm and more preferably from about 0.5 mm to about 3 mm. In other embodiments, a peripheral zone has a variable width circumferentially.

As briefly described above, in exemplary embodiments, a peripheral zone is structurally or materially configured to focus at least one semi-meridian of the peripheral image field anterior or posterior to at least another semi-meridian of the peripheral image field with reference to the retina. The peripheral image field may be focused differently on semi-meridians adjacent, orthogonal, and/or alternate to one another. For instance, in an exemplary embodiment, the peripheral image field is moved in the sagittal and/or tangential meridians with reference to the retina to regulate regular astigmatism.

The above being said, because the peripheral image field in an infinite number of semi-meridians may be moved based upon measurements obtained for example, using keratometry, corneal topography, optical coherence tomography, Scheimpflug imaging, or other conventional biometric instrumentation, the present invention may be used to regulate irregular astigmatism, as well as other optical aberrations.

Figure 2A:
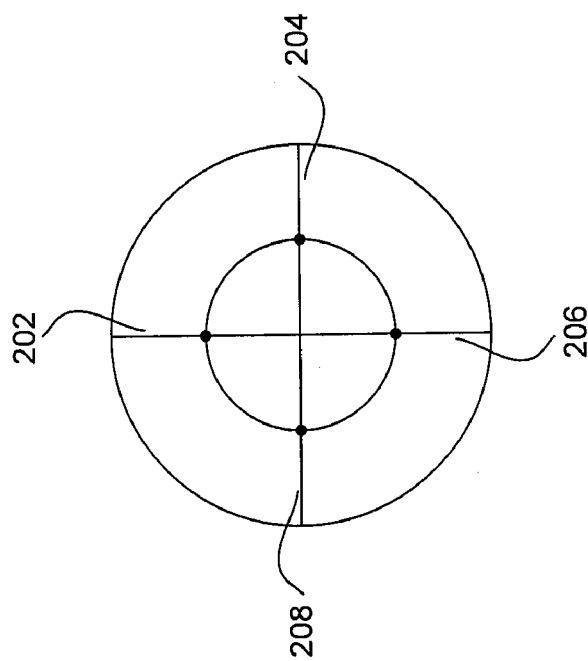

With reference to FIGS. 2A and 2B, an exemplary peripheral zone is configured to selectively focus peripheral, or off-axis, light rays on, in front of, or behind the retina. At a semi-meridian 202, off-axis focus 203 is on retina 212. At an orthogonal semi-meridian 204, off-axis focus 205 is in front of retina 212. At a semi-meridian 206, alternate to semi-meridian 202, off-axis focus 207 is again on retina 212. Finally, at a semi-meridian 208, off-axis focus 209 is again in front of retina 212. It should be appreciated that FIGS. 2A and 2B merely depict an exemplary embodiment, and a focus on any one of an infinite number of semi-meridians may be on, in front of, or behind the retina.

Moreover, an off-axis image field focus at a chord diameter on a given semi-meridian may be on, in front of, or behind the retina, while an off-axis image field focus at a different chord diameter on the very same semi-meridian may be independently on, in front of, or behind the retina. In such embodiments, the radial transitions may be defined as smooth, linear or otherwise uncurved, or defined by a sigmoid, conic constant or other polynomial expression.

In general, one skilled in the art will appreciate that numerous approaches may be taken to accomplish select off-axis retinal focus, all of which are contemplated herein. For example, select off-axis retinal focus may be achieved with refractive, birefringent, or diffractive optics.

In exemplary embodiments, select off-axis retinal focus is achieved with a peripheral zone having a refractive power different relative to the central zone such that all or a portion of off-axis light rays along a semi-meridian focus in front of or behind off-axis light rays along another semi-meridian, with reference to the retina.

In other embodiments, select off-axis retinal focus is achieved with a peripheral zone comprised of a birefringent material having properties selected to cause all or a portion of off-axis light rays along a semi-meridian to be focused in front of or behind off-axis light rays along another semi-meridian, with reference to the retina, for example, in a manner similar to that described in co-pending U.S. patent application Ser. No. 12/110,999, entitled "System and Method to Treat and Prevent Loss of Visual Acuity," which is incorporated herein by reference in its entirety.

In other embodiments, select off-axis retinal focus is achieved with diffractive optics. More particularly, in exemplary embodiments, diffractive optics are used to focus all or a portion of peripheral light rays along a semi-meridian in front of or behind peripheral light rays along another semi-meridian, with reference to the retina.

Select off-axis retinal focus, or stated differently, selectively focusing the peripheral image field on, in front of, or behind the retina at different meridians, in exemplary embodiments, causes axial eye lengthening or relative shortening in the direction of the focus with reference to the retina. In exemplary embodiments, peripheral defocus influences local globe growth and shape of the globe (e.g., axial, equatorial, mid peripheral and/or far peripheral) that in turn appears to influence corneal, foveal, and/or retinal shape. In exemplary embodiments, relative shortening may occur in the juvenile eye when growth related eye enlargement normally necessitating axial length increase has that increase partially or completely blocked by a placement of the image in front of the peripheral retina In exemplary embodiments, the eye and/or cornea is lengthened or relatively shortened in the near-periphery, mid-periphery, and/or far-periphery. The axis and magnitude of lengthening or relative shortening in exemplary embodiments depends upon placement of focus of the peripheral image field with reference to the retina. In some embodiments, the central cornea is stimulated to substantially change shape, while in other embodiments, the central cornea is not stimulated to substantially change shape.

Figure 3:
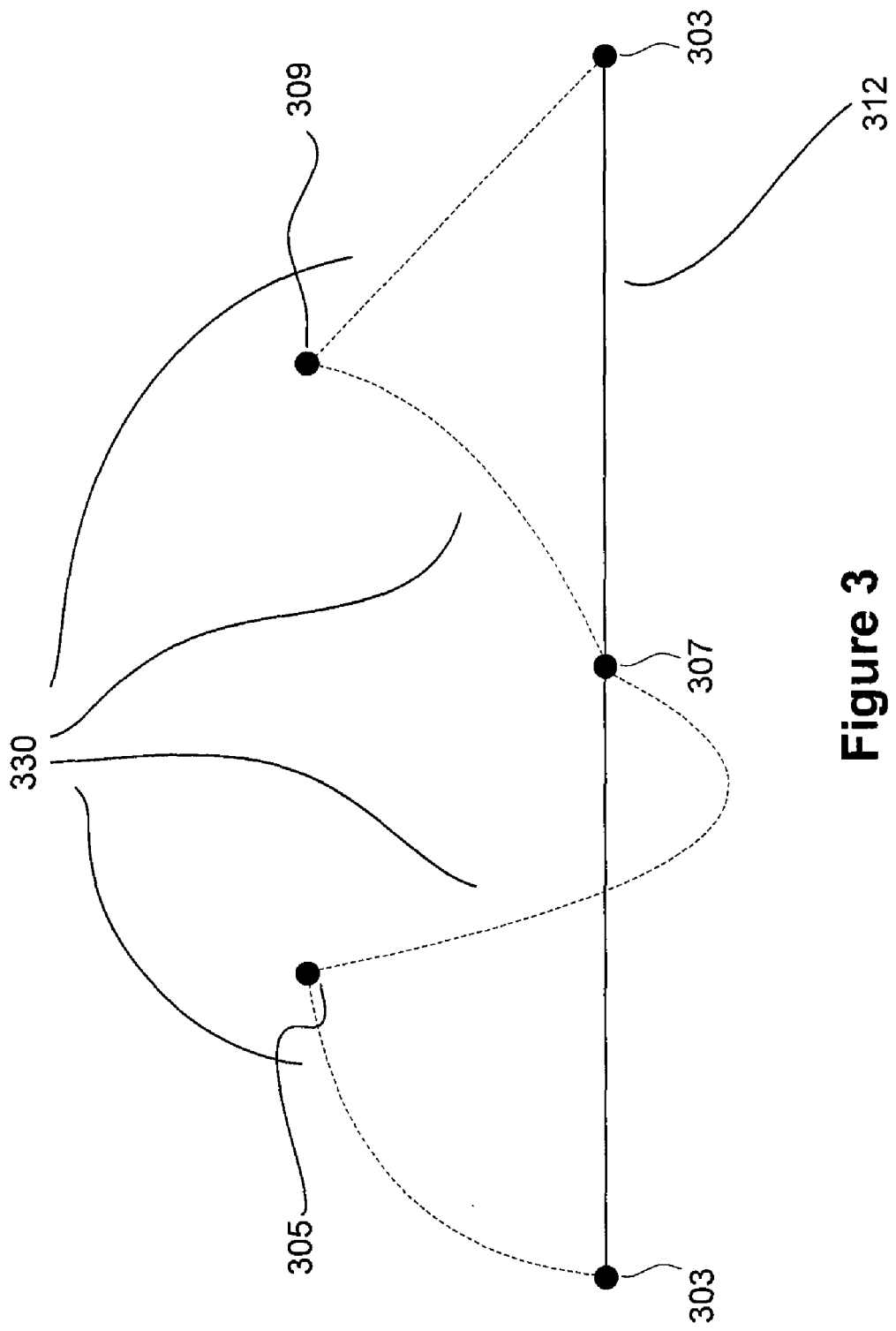
FIG. 3 illustrates rotational transitions between off-axis foci with reference to the retina at different semi-meridians, provided for by a therapeutic optical device of the present invention.

As shown in FIG. 3, the rotational transition 330 between the off-axis image field focuses 303, 305, 307 and 309, along adjacent semi-meridians with reference to retina 312, may be further defined as smooth, linear or otherwise uncurved, or defined by a sigmoid, conic constant or other polynomial expression.

Being able to define the rotational transition between the off-axis image field focus along adjacent semi-meridians provides for controllable lengthening or relative shortening of the eye and/or cornea between adjacent semi-meridians, for the reasons above.

Corneal Reshaping Lenses

In exemplary embodiments the therapeutic optical device of the present invention comprises a lens structurally or materially configured to reshape the mid peripheral cornea to cause the mid peripheral cornea itself to become the therapeutic source of the off axis defocus. In an exemplary embodiment, primary induced changes in the mid peripheral cornea cause local peripheral defocus that in turn influences local globe growth and shape of the globe (e.g., axial, equatorial, mid peripheral and/or far peripheral). Therapeutic applications of such growth and reshaping include correction or regulation of myopia, hyperopia, and astigmatism, to name a few.

Device Surfaces

As discussed earlier, the therapeutic optical device of the present invention may be, inter alia, configured to rest upon the cornea or for placement within ocular tissue. With regard to an exemplary device configured to rest upon the cornea, and in some cases also the sclera, of the eye, the posterior surface thereof may substantially topographically match the surface(s) upon which it is configured to rest. For instance, the posterior surface may be substantially spherical or otherwise spatially designed so as to substantially uniformly rest upon the desired surface(s) of the eye. In contrast, the anterior surface may, but need not conform to the eye.

With regard to an exemplary device configured to rest upon the cornea of the eye and to reshape the cornea, for example, to reshape the mid peripheral cornea, the posterior surface thereof may comprise a central zone and one or more annular zones. In exemplary embodiments, the central zone has an apical radius substantially the same as the apical radius of the central cornea, such that the central cornea is not reshaped. In exemplary embodiments, the central zone has a higher eccentricity than the cornea being treated. In exemplary embodiments, the central zone is an alignment zone.

In exemplary embodiments, a first annular treatment zone vaults the mid peripheral cornea. In exemplary embodiments, a first annular treatment zone vaults the mid peripheral cornea by having a radius that is shorter than that of the underlying mid peripheral cornea. One skilled in the art will appreciate that various other approaches may be used such that a first annular treatment zone vaults the mid peripheral cornea, e.g., lifting. In exemplary embodiment, the first annular treatment zone may be described as spherical, aspherical, and radially defined by a polynomial, uncurved and defined by an angle, or may be defined by spline mathematics. In exemplary embodiment, the first annular treatment zone may be described as a sigmoid. In exemplary embodiments, a second annular zone acts as a corneal landing zone.

The higher eccentricity of the central alignment zone than the cornea is intended to create a wedge of clearance between the lens and the cornea just medial to the first annular treatment zone. This wedge of clearance allows for the commencement of an increase in corneal thickness just medial to the treatment zone and facilitates a transfer of epithelial cells and intracellular and intra stromal fluids into the treatment zone as a response to the compression force of the lens on the eye during closed eye wearing.

The shape of the posterior surface of the treatment zone and the continued clearance anterior to the cornea provide a void into which the tissue and fluids can pass. In addition the wedge shaped clearance in the most medial aspect of the landing zone allows for an increase in corneal thickness just peripheral to the treatment zone and facilitates a transfer of epithelial cells and intracellular and intrastomal fluids into the cornea posterior to the treatment zone as a response to the compression force of the lens on the eye during closed eye wearing.

In exemplary embodiments, corneal reshaping varies between semi-meridians adjacent, orthogonal, and/or alternate to one another. In other words, an annular treatment zone may be rotationally asymmetric to thereby influence local globe growth and shape of the globe (e.g., axial, equatorial, mid peripheral and/or far peripheral) in a rotationally asymmetric manner.

Rotational Stability

Exemplary therapeutic optical devices in accordance with the present invention may be used in connection with one or more structural or material design elements configured to provide rotational stability.

For example, with application to exemplary devices configured to rest upon the cornea, some embodiments comprise one or more of prism ballasting, double slab off, and anterior thickness variations to assist with rotational stability. In some embodiments, rotational stability is improved by spatially matching the posterior device surface with one or more corneal or scleral topographical variations, for example, in a manner similar to that described in co-pending U.S. patent application Ser. No. 12/413,319, entitled "Contact Lens with Meridional Sagittal Variation and Methods for Making and Using the Same," which is incorporated herein by reference in its entirety.

Similarly, with application to exemplary devices configured for placement within ocular tissue, (in addition to, or in substitution of, those described above) some embodiments comprise one or more of corneal pockets, adhesives, laser sealing, and sutures to assist with rotational stability.

Persons skilled in the art will appreciate many methods or structural or material design elements configured to give rotational stability to therapeutic optical devices of the present invention, all of which fall within the spirit and scope of the invention.

Examples

Selectively adjusting the focus of the peripheral, or off-axis, image field along the same semi-meridian(s), or vis-à-vis adjacent, orthogonal, and/or alternate semi-meridians, whether by an intracorneal or intraocular implant, a corneal lens, corneal reshaping lens, or otherwise, may enable a health care provider to stimulate eye and/or corneal reshaping.

Stated differently, local peripheral defocus created by a therapeutic optical device of the present invention influences local globe growth and shape of the globe (e.g., axial, equatorial, mid peripheral and/or far peripheral) that in turn appears to influence corneal, foveal, and/or retinal shape. In exemplary embodiments, the defocus influences retinal change in a semi-meridian that in turn influences a change in the central corneal radius or fovea. Therapeutic applications of such growth and reshaping include correction or regulation of myopia, hyperopia, and astigmatism, to name a few.

The therapeutic optical device of the present invention may be used to correct or regulate image fields having low or no spherical aberration, and positive or negative relative curvature of field. Moreover, correction or regulation of mixed or irregular relative curvature is enabled, for example, if the central to mid-peripheral field is hyperopic but the mid-peripheral to far-peripheral field is myopic.

As an example, if in a particular meridian, lengthening is desired (e.g., the eye is hyperopic in that meridian), a health care provider may place the therapeutic peripheral image field behind the retina in that meridian. On the other hand, if in a particular meridian, relative shortening is desired (e.g., the eye is myopic in that meridian), a health care provider may place the therapeutic peripheral image field in front of the retina in that meridian. In exemplary embodiments, lengthening (e.g., axial or equatorial) reduces the radius of curvature of the cornea in the substantially same meridian and relative shortening (e.g., axial or equatorial) increases the radius of curvature of the cornea in the substantially same meridian.

Figure 4:
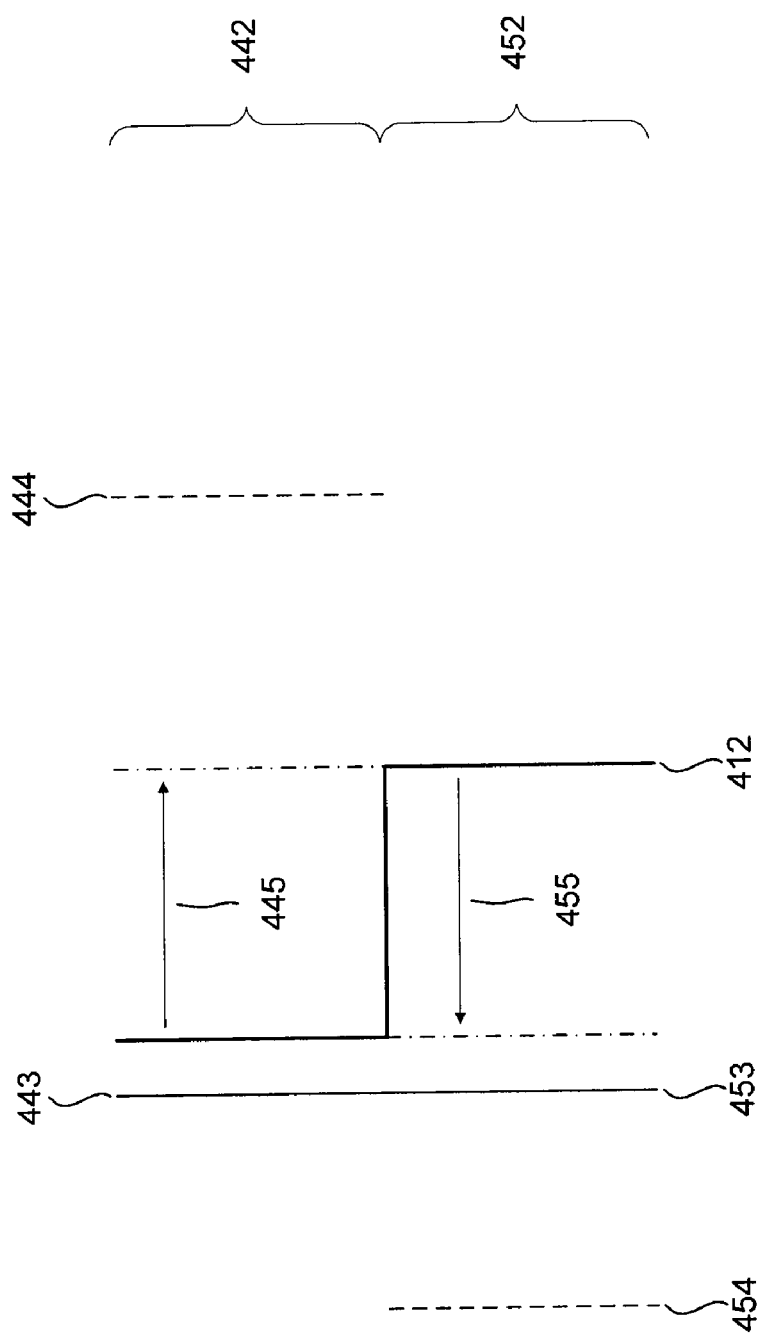
FIG. 4 illustrates eye and/or corneal reshaping provided by a therapeutic optical device of the present invention.

In some embodiments, a health care provider may find it appropriate to worsen the refractive error along one or more semi-meridians, so that the resultant eye geometry is more regular and thereby easier to correct. For example, as shown in FIG. 4, an untreated off-axis focus 443 in semi-meridian 442 is anterior to retina 412 (i.e. myopic in that meridian) and an untreated off-axis focus 453 in semi-meridian 452 is substantially more anterior to retina 412 (i.e. more myopic in that meridian).

While a provider of health care may determine it most appropriate to place a therapeutic off-axis point 454 anterior to retina 412 in semi-meridian 452 to cause relative eye shortening 455, a provider of health care may determine it most appropriate to place a therapeutic off-axis point 444 posterior to retina 412 in semi-meridian 442 to cause eye lengthening 445. The result in the latter would be more blurred vision in semi-meridian 442, but an overall eye shape easier to correct using conventional refractive error correction methods.

In conjunction with corneal, foveal, and/or retinal reshaping, a health care provider may compensate for refractive error using traditional non-reshaping methods.

The foregoing disclosure is illustrative of the present invention and is not to be construed as limiting the invention. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention, and are not to be construed as limited to the specific embodiments disclosed.

We claim:

1. A therapeutic optical device for inducing change in the shape of a meridian of an eye,
   wherein said device is configured to reshape the mid peripheral cornea such that an off-axis image field in said meridian is focused in a direction reshaping is preferred, with reference to the retina;
   wherein said device is configured to vault the mid peripheral cornea; and
   wherein said device is configured to focus a central image field on the retina in all meridians.

2. A therapeutic optical device according to claim 1, wherein said device is configured to focus a second off-axis image field in a second meridian in a direction reshaping is preferred, with reference to the retina.

3. A therapeutic optical device according to claim 1, further configured to provide rotational stability.

4. A therapeutic optical device according to claim 1, wherein said device comprises a central zone and a peripheral zone.

5. A therapeutic optical device according to claim 4, wherein said peripheral zone has a refractive power different relative to the central zone, wherein said refractive power is selected to focus said off-axis image field in said meridian in said direction reshaping is preferred, with reference to the retina.

6. A therapeutic optical device according to claim 4, wherein said peripheral zone is comprised of a birefringent material, wherein said birefringent material is selected to focus said off-axis image field in said meridian in said direction reshaping is preferred, with reference to the retina.

7. A therapeutic optical device according to claim 4, wherein said central zone is spherical.

8. A therapeutic optical device according to claim 4, wherein said central zone is aspherical.

9. A therapeutic optical device according to claim 4, wherein said central zone is toric.

10. A therapeutic optical device according to claim 4, wherein said central zone is multifocal.

11. A therapeutic optical device according to claim 4, wherein said central zone is rotationally non-symmetrical.

12. A therapeutic optical device,
    wherein said device is configured to focus a first off-axis image field in a first meridian on or anterior or posterior to the retina;

wherein said device is configured to focus a second off-axis image field in a second meridian anterior or posterior to said first off-axis image field;

wherein said device is configured to create a wedge of clearance between said device and the mid peripheral cornea; and wherein said device is configured to focus a central image field on the retina in at least one meridian.

13. A therapeutic optical device according to claim 12, wherein the device is configured to rest upon the cornea.

14. A therapeutic optical device according to claim 12, wherein the device is configured for placement within ocular tissue.

* * * * *